No. 730,789. PATENTED JUNE 9, 1903.
J. NEILL.
GLUED JOINT FOR TURNED COLUMNS.
APPLICATION FILED JAN. 20, 1902.
NO MODEL.

Attest:
L. Lee.
Walter H. Talmage.

Inventor.
James Neill, per
Thomas S. Crane, Atty.

No. 730,789. Patented June 9, 1903.

UNITED STATES PATENT OFFICE.

JAMES NEILL, OF ORANGE, NEW JERSEY.

GLUED JOINT FOR TURNED COLUMNS.

SPECIFICATION forming part of Letters Patent No. 730,789, dated June 9, 1903.

Application filed January 20, 1902. Serial No. 90,438. (No model.)

*To all whom it may concern:*

Be it known that I, JAMES NEILL, a citizen of the United States, residing at 131 Essex avenue, Orange, county of Essex, State of New Jersey, have invented certain new and useful Improvements in Glued Joints for Turned Columns, fully described and represented in the following specification and the accompanying drawings, forming a part of the same.

The object of the present invention is to furnish an improved construction for a column-stave joint whereby the joint may be intersected only upon a radial line when the outer part of the column is turned to form grooves and moldings thereon. This result is obtained by forming a group of small angular ribs upon the inner part of the joint, leaving the outer part of the joint between the staves entirely radial, so that when the surface is turned it may intersect the joint at a right angle. By forming the group of ribs upon the inner part of the joint the projection of the ribs can be secured in most cases without cutting the stuff for the staves of any greater width than its outside edge, thus reducing the cost of the material to the lowest point. Angular ribs and grooves are adapted to fit together much more readily when making a glue joint than tongues and grooves having parallel or nearly-parallel faces, and the sections of a column can with my construction be assembled and glued together with much greater rapidity than with a tongue-and-groove joint.

The invention will be understood by reference to the annexed drawings, in which—

Figure 1:
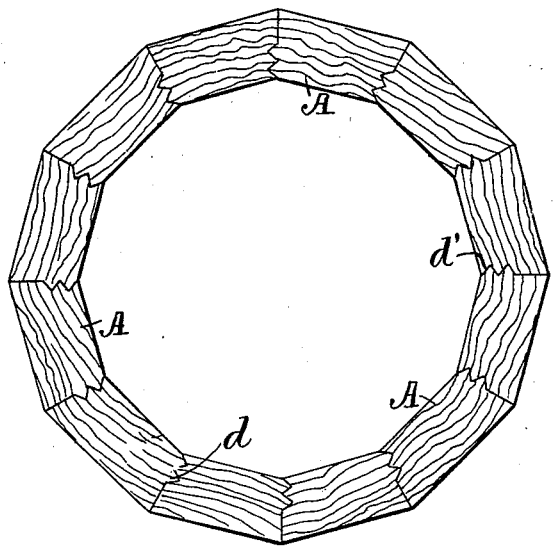
Figure 2:
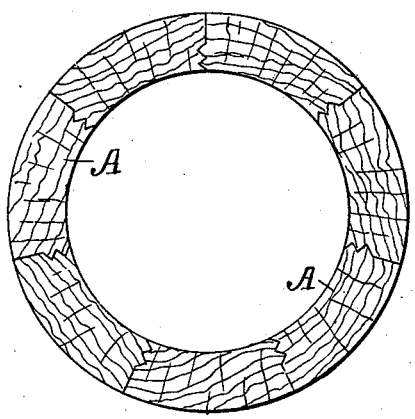
Figure 3:
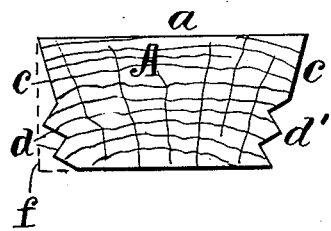
Figure 4:
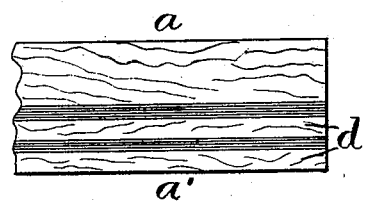

Figure 1 is an end view of a column made of twelve staves, and Fig. 2 is an end view of a column made with seven staves. Fig. 3 is an end view of a single stave, and Fig. 4 a side view of the same broken transversely for want of room upon the drawing.

*a* designates the outer side of the stave, *a'* the inner side, and *c* and *c'* the opposite beveled edges upon which the joint is formed. The edge *c* is shown provided next the side *a'* with two angular ribs *d*, and the edge *c'* next the side *a'* with corresponding angular grooves *d'*.

The dotted line *f* in Fig. 3 shows the original width of the stave before the bevel and the angular ribs are formed thereon and indicates that the joint with the ribs can be formed of stuff having no greater width than the outer side of the stave. Fig. 1 shows the staves assembled and glued together in readiness for turning, the glue being very readily applied to the shallow angular grooves and the joints thus rapidly and easily formed.

Fig. 2 shows the staves turned round upon the exterior and a great portion of the thickness of each stave intersected upon the outer side by a radial joint where the edges *c* and *c'* of the staves are glued together. Any cutting or turning into the exterior of the column which is necessary to form moldings and ornamental designs thereon thus intersects the joint at the most favorable angle, which exposes the glue of the joint in the least possible degree, and avoids the intersection of the joint at an acute angle which exposes the wood to splinter away at one side of the joint, as when the latter lies at an acute angle with the periphery.

I am aware that a single angular rib has been used to hold parts in alinement where no glue is employed; but I believe my construction is the first where oblique angular ribs have been used in a glue joint with a group of such ribs formed adjacent to the inner side of the stave, so as to leave a radial surface in the outer half of the joint where the column is likely to be intersected in turning. By using a group of such angular ribs an extended surface for the contact of the glue is obtained without making the inner edge of the stave materially wider than the outer edge.

I am aware of Peard's patent, No. 696,188, issued March 25, 1902, which shows a joint having a projecting rounded rib associated with an adjacent rounded groove, and of Smyth's patent, No. 385,075, issued January 26, 1888, for a butter-package, which shows staves having a detachable joint provided with a single angular rib and groove; but I am not aware of any turned column having a glued joint in which a group of small angular ribs is provided upon the inner half of the joint to furnish an extended glued surface without making the inner edge of the stave any wider than the outer edge. I have made a special claim to this construction, as the angular form of the ribs greatly facilitates the application of the glue and the fitting of the staves together in building up the column and provides an extended surface for the glue, while the group of small ribs is more readily made and can be formed at the appropriate place upon the edge of the column with more facility than ribs of curved and complex outline.

What I claim as my invention is—

A turned column having a series of staves with glued joints and the contiguous edges of the staves provided next the outer side with radial surfaces, and one edge next the inner side being provided with a group of small angular ribs, and the opposite edge next the inner side provided with a group of small angular grooves corresponding to the said angular ribs, whereby the inner edge of the stave does not exceed the outer edge in width, and the outer half of the joint being wholly radial is adapted to be intersected at right angles when grooves and moldings are turned into the substance of the column.

In testimony whereof I have hereunto set my hand in the presence of two subscribing witnesses.

JAMES NEILL.

Witnesses:
J. ALEXANDER NEILL,
THOMAS S. CRANE.